June 11, 1940.                F. G. MERCKEL                 2,204,225
                    METHOD OF AND MEANS FOR PURIFYING WATER
                          Original Filed June 27, 1936
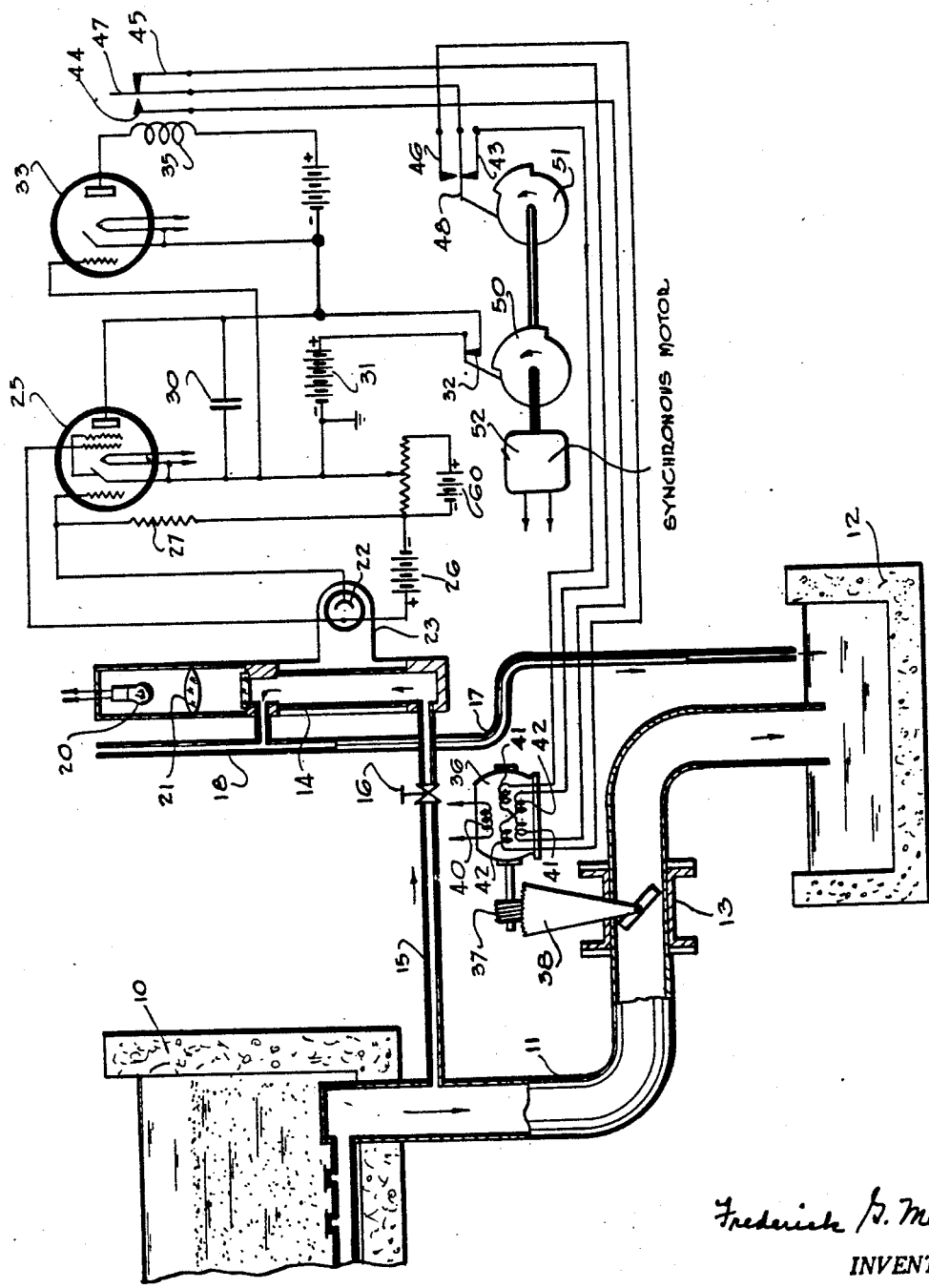
Frederick G. Merckel
INVENTOR.
BY Cooper, Kerr & Dunham
   his ATTORNEYS.

Patented June 11, 1940

2,204,225

UNITED STATES PATENT OFFICE 2,204,225

METHOD OF AND MEANS FOR PURIFYING WATER

Frederick G. Merckel, Montclair, N. J., assignor to Wallace & Tiernan Products, Inc., Belleville, N. J., a corporation of New Jersey Application June 27, 1936, Serial No. 87,627
Renewed November 23, 1938

10 Claims. (Cl. 210—125)

This invention relates to water purification, i. e., to the removal of solid matter from water. More specifically, the invention relates to the purification of water by filtration and, in a still more specific aspect, purification, by filtration, of water intended for drinking.

Among other objects the invention has for its purpose to provide reliable methods and means for efficiently and automatically removing solid matter from water. Other objects and advantages will appear as the invention is hereinafter disclosed.

While other forms of apparatus may be employed in carrying my invention into practice, a preferred form of apparatus is illustrated in the drawing, somewhat diagrammatically.

The invention has its chief application in the filtration of water intended for drinking. Referring to the drawing, there is shown a filter bed 10, which may be of the type commonly employed in a rapid sand filter plant, to which water to be filtered is supplied and from which the filtered water, i. e., the effluent or filtrate, is discharged through an effluent pipe 11 into the clear well 12 prior to its distribution throughout the succeeding system. A valve 13, which may be of the butterfly type, is provided in the pipe 11 to control the flow of the filtrate from the filter and thereby to control the rate of filtration, i. e., the extent to which the solid matter is removed from the water. Moving the valve 13 toward closed position decreases the flow through the pipe 11 and reduces the turbidity of the effluent or filtrate and vice versa.

There is provided a device for scanning the effluent and for automatically controlling the valve 13, through suitable translating mechanism, in accordance with the turbidity of the scanned effluent so as to maintain the turbidity of the effluent substantially constant or uniform as predetermined and desired. By this method and these means the desired degree of clarity (or permissible unobjectionable turbidity) of the effluent is automatically maintained.

While the main stream through the pipe 11 may be directly scanned in some cases, it is preferable that a sample stream thereof be scanned. For this purpose there is provided a sampling chamber 14 whose lower portion receives effluent from the pipe 11, through the pipe 15, and whose upper portion discharges the effluent through a pipe 18 into the clear well 12 or, if desired, to waste. A riser 19 may be provided to permit the escape of air or gases and a manually operable valve or cock 16 in the pipe 15 may be employed to control the flow of effluent through the sampling chamber. Normally, the flow of effluent is from the pipe 11, through the pipe 15, upwardly through the sampling chamber 14, and thence through the pipe 17 to the clear well 12 or to waste. A suitable light source 20 and lens 21 projects a parallel ray beam of light downwardly through the upwardly rising column of effluent. A light-responsive device, preferably a photoelectric cell 22, is mounted at one side of the sampling chamber 14, in a laterally extending chamber 23 thereof, and is adapted to receive light from the interior of the sampling chamber through a translucent or transparent wall portion thereof.

If the column of liquid flowing through the sampling chamber 14 is absolutely clear, the light beam passing downwardly therethrough will not be reflected into the photoelectric cell 22. However, when there are any solid particles present in the column of liquid, light is reflected therefrom into the photoelectric cell and the amount or quantity of light so reflected is a function of degree of turbidity of the liquid.

The photoelectric cell 22 is connected in series with its supply battery 26 and a resistance 27. The voltage drop across the resistance 27 is impressed on the control grid of a screen grid electron amplifier tube 25 whose heater is supplied with the usual heating current from a source not shown. A condenser 30 is connected across the plate circuit of the tube 25 and is connected to the B battery 31 when the contacts 32 are closed. When the contacts 32 are closed, the battery 31 charges the condenser 30 and when the contacts 32 are opened the condenser 30 discharges through the tube 25 at a rate dependent upon the voltage on the control grid of the latter. The condenser 30 is connected also across the grid-cathode of the electron tube relay 33 so that the grid of this tube 33 is maintained below cut-off potential until the charge has entirely leaked off the condenser through the tube 25. When this has occurred, the tube 33 causes a relay 35, in its plate circuit, to operate. The heater of the tube 33 is supplied with heating current from a suitable source, not shown.

The relay 35, in conjunction with cam-controlled contacts presently to be described, controls the direction of rotation of a reversible motor 36 which is connected to the valve 13 to open or close the same depending upon the direction of rotation of the motor shaft. This drive may conveniently be effected by a worm 37 secured to the motor shaft and meshing with a wormsegment 38 secured to the shaft of the valve 13. The motor 36 may be of the shading coil induction motor type, such as that shown in Letters Patent of the United States No. 1,895,880, with its main field winding 40 energized from a 110 volt A. C. line (not shown) and one set of shading coils 41 connected across the contacts 43 and 44 and the other set of shading coils 42 connected across the contacts 45 and 46; the armature 47 of the relay 35 being connected to the cam-operated contact 48. When the back contacts 47—45 of the relay 35 are closed and the cam contacts 48—46 are also closed, the circuit of the set of shading coils 42 is closed and the motor 36 runs in one direction; and when the front contacts 47—44 of the relay 35 are closed and the cam contacts 48—43 are also closed, the circuit of the other set of shading coils 41 is closed and the motor 36 runs in the opposite direction. When the circuits of both sets of shading coils are open, the motor does not run at all.

The cam contacts are operated by cams 50, 51 secured to a cam shaft driven by a synchronous motor 52 such as that commonly employed in electric clocks and is supplied from the usual A. C. line (not shown). Assuming that the cam shaft is being driven at ¼ R. P. M., the cam 50 holds the contacts 32 open for one minute whereupon they close automatically and remain closed for three minutes, and the cam 51 holds the contacts 48—46 closed and the contacts 48—43 open for thirty seconds whereupon the contacts 48—46 automatically open and the contacts 48—43 automatically close and the contacts 48—46 and 48—43 remain in the last described conditions for three minutes and thirty seconds. The cam 51 closes its contacts 48—46 (and opens its contacts 48—43) thirty seconds after the cam 50 opens its contacts 32.

The system is designed, constructed, adjusted and connected to operate substantially as follows. With the parts in the position shown, the battery 31 charges or has charged the condenser 30. When the contacts 32 open, the condenser 30 discharges through the tube 25. The current flowing through the photo-electric cell or tube 22 is proportional to the quantity of light which it receives and consequently the voltage impressed upon the control grid of the tube 25 is proportional to the quantity of light received by the cell 22. Therefore, the time it takes to discharge the condenser 30 is inversely proportional to the amount of light impinging on the photo electric cell 22. Consequently the time at which the relay 35 receives sufficient current to cause its back contacts 47—45 to open, and its front contacts 47—44 to close, is dependent upon the amount of light impinging on the cell 22. Assume that the amount of light impinging on the cell 22 is such that the relay 35 causes its contacts 47—44 to close during the first thirty seconds following opening of the contacts 32. The contacts 47—44 and 48—43 are then both closed and the circuit of the set of shading coils 41 is closed to cause the motor 36 to operate the valve in one predetermined direction, until the contacts 48—43 are opened by the cam 51, whereupon the motor stops. Assume now that the amount of light impinging on the cell 22 is such that the relay 35 does not cause its contacts 47—44 to close (and contacts 47—45 to open) until after the contacts 48—43 have opened (and contacts 48—46 have closed). The circuit of the set of shading coils 41 will not have been closed but the circuit of the set of shading coils 42 is closed, by closure of contacts 48—46 and 47—45, and the motor 36 operates the valve in the opposite direction until the relay contacts 47—45 open, when the motor stops. If the relay contacts 47—44 close at the same time that the cam contacts 48—43 open, and the relay contacts 47—45 open at the same time the cam contacts 48—46 close, the motor 36 will not run in either direction.

If the effluent or filtrate does not have the desired clarity, the valve 13 is thus automatically closed until filtering takes place at such slower rate as to cause filtrate to have the desired clarity. The valve adjustment is effected in increments, so to speak, i. e., the valve is moved toward closed position during each half-minute period determined by the cam-operated contacts, until the desired adjustment is effected. The extent of each adjustment of the valve 13 effected by the photocell controlled contacts is proportional to the amount by which the clarity of the sample differs from that desired, and abrupt and hunting movement of the valve is thus avoided. The filtering automatically takes place at the most rapid rate that will produce the desired clarity of filtrate so that maximum efficiency is attained at all times.

The apparatus may be adjusted to select the degree of clarity or turbidity desired by adjusting one or more of the following: the grid bias of the tube 25 as by means of the potentiometer 60, or the value of the resistance 27, or the plate voltage 31.

The method may be carried out with other apparatus. For example, the purification of the liquid, i. e., the removal of the solid matter from the liquid, may be effected by sedimentation instead of filtration, as in the case of treatment of sewage, in which case the control of the flow of the liquid undergoing treatment may be advantageously effected on the input side of the solid-removing apparatus, instead of the output side thereof. For this last mentioned use, the apparatus may be so adjusted as to maintain the effluent at a predetermined degree of permissible turbidity, greater than that permitted for drinking water. Furthermore, while the combination of instrumentalities shown is preferred, the control of the valve 13 by the photo electric cell 22 may be effected in other ways.

Certain features disclosed but not specifically claimed herein, are being claimed in the copending application of David Crampton, Serial No. 147,425, filed June 10, 1937, for Apparatus for controlling the condition of material: viz., the intermittent, progressive adjustment of a filter effluent or the like; treatment adjustment by periodic increments each proportioned to the need of correction; and the specific electrical instrumentalities for controlling the valve operating motor by the photo cell, e. g., by intermediately controlling the rate of a condenser discharge.

What I claim is:

1. Apparatus for purifying water comprising in combination, means for removing solid matter from the water, means for controlling the rate of flow of the water through said first mentioned means, and light-responsive means for controlling said second mentioned means in accordance with the turbidity of the water flowing from said first mentioned means.

2. Apparatus for purifying water comprising in combination, a filter, a light-responsive device for detecting solid matter in the filtered water, and means controlled by said light-responsive device for controlling the rate of discharge of the water from the filter.

3. Apparatus for purifying water comprising in combination, a filter, a valve in the outlet of said filter, a photo electric cell for scanning water flowing from the filter, and translating means operating said valve under the control of said photo electric cell whereby increase of turbidity of the filtered water automatically causes said valve to move toward closed position to decrease the flow from the filter and decrease of turbidity of the filtered water automatically causes said valve to move toward open position to increase the flow from the filter.

4. In a method of controlling the rate of flow of liquid through a solid-removing purifying apparatus, in combination, the steps of photo-electrically scanning the effluent, converting variations in turbidity of the scanned effluent into variations in electric current, and converting variations of the electric current into variations in the rate of flow of the liquid to vary the rate of flow inversely in accordance with the turbidity.

5. In a method of controlling the rate of flow of a liquid through a solid-removing purifying apparatus, in combination, the steps of photo-electrically scanning the effluent, converting variations in turbidity of the scanned effluent into variations in electric current, and converting variations of the electric current into variations in the rate of flow of the liquid to maintain the turbidity of the effluent substantially at a predetermined desired degree.

6. In a method of controlling the rate of flow of a liquid through a purifying system wherein the liquid is purified without substantial change in its volume and wherein the results of purification treatment are optically detectable in the effluent of treated liquid from the system, the steps including photo-electrically scanning the effluent to detect variations in the results of the purifying treatment, converting said photo-electrically scanned variations in the results of treatment into variations in electric current, and converting variations of the electric current into variations in the length of time in which successive quantities of the liquid are maintained in the purifying system and subjected to treatment therein, by variably throttling the effluent to maintain the results of the purification treatment, in the effluent, substantially at a predetermined desired degree.

7. In a method of controlling the rate of flow of a liquid through a purifying system for effecting purification treatment of which the results are optically detectable in the treated liquid, in combination, the steps of testing the effluent to detect variations in said results of the purification treatment, including photo-electrically detecting optical variations corresponding to said variations in results, converting said optical variations into variations in electric current, and converting variations of the electric current into variations in the rate of flow of the liquid to maintain the said optically detectable results of the purification treatment, in the effluent, substantially at a predetermined desired degree.

8. In a method of controlling the rate of flow of a liquid through a system for purification treatment thereof, in combination, the steps of converting variations in the results of the purification treatment in the effluent from the system into variations of light, photo-electrically detecting said variations of light, converting said detected variations of light into variations in electric current, and converting variations of the electric current into variations in the rate of effluence of the liquid to maintain the results of the purification treatment, in the effluent, substantially at a predetermined degree.

9. In a method of controlling the rate of flow of a liquid through a treatment system wherein the liquid is treated without substantial change in its volume and wherein the results of the treatment are optically detectable in the treated liquid, in combination, the steps of converting variations in the condition of the effluent from the system into variations of light, photo-electrically detecting said variations of light, converting said detected variations of light into variations in electric current, and converting variations of the electric current into variations in the rate of flow of the liquid through the system to maintain the optically detectable results of the treatment substantially at a predetermined desired degree in the effluent.

10. In a method of controlling the rate of flow of a liquid through a treating system wherein the rate of treatment of the liquid is controllable by varying the rate of flow of the effluent of treated liquid from the system and wherein the results of the treatment are optically detectable in the treated liquid, in combination, the steps of converting variations in the condition of the effluent from the system into variations of light, photo-electrically detecting said variations of light, converting said detected variations of light into variations in electric current, and converting variations of the electric current into variations in the rate of effluence of the liquid, by variably throttling the effluent in response to said variations of current, to maintain the optically detectable results of the treatment substantially at a predetermined desired degree in the effluent.

FREDERICK G. MERCKEL.